United States Patent
Repetti

Patent Number: 5,961,173
Date of Patent: Oct. 5, 1999

[54] WORK BOX FRAME

[76] Inventor: Thomas A. Repetti, 6802 Oak Hammock Dr., Bradenton, Fla. 34202

[21] Appl. No.: 08/806,345

[22] Filed: Feb. 26, 1997

[51] Int. Cl.[6] .................................................. B60N 3/12
[52] U.S. Cl. ................. 296/37.6; 296/37.1; 296/100.09; 296/100.07; 296/100.01; 296/100.17
[58] Field of Search ................................ 296/37.6, 37.1, 296/100.06, 100.07, 100.09, 100.08, 100.01, 100.17, 100.18; 52/732.1, 737.6

[56] References Cited

U.S. PATENT DOCUMENTS

| | | | |
|---|---|---|---|
| 3,489,456 | 1/1970 | Klanke | 296/100.07 |
| 4,079,989 | 3/1978 | Robertson | 296/100 |
| 4,313,636 | 2/1982 | Deeds | 296/100 |
| 4,418,954 | 12/1983 | Buckley | 296/100 |
| 4,547,014 | 10/1985 | Wicker | 296/100 |
| 4,615,557 | 10/1986 | Robinson | 296/100 |
| 4,807,921 | 2/1989 | Champie, III et al. | 296/100 |
| 4,824,162 | 4/1989 | Geisler et al. | 296/100 |
| 4,832,395 | 5/1989 | Lovaas | 296/100 |
| 4,844,531 | 7/1989 | Kooiker | 296/100 |
| 4,861,092 | 8/1989 | Bogard | 296/100 |
| 4,946,217 | 8/1990 | Steffens et al. | 296/100 |
| 5,040,843 | 8/1991 | Russell et al. | 296/100 |
| 5,087,093 | 2/1992 | Repetti | 296/100 |
| 5,127,701 | 7/1992 | Miller | 296/100 |
| 5,201,561 | 4/1993 | Brown | 296/37.5 |
| 5,263,761 | 11/1993 | Hathaway et al. | 296/100 |
| 5,427,428 | 6/1995 | Ericson et al. | 296/98 |
| 5,564,773 | 10/1996 | Lapsley et al. | 296/100 |
| 5,636,893 | 6/1997 | Wheatley et al. | 296/100 |
| 5,653,491 | 8/1997 | Steffens et al. | 296/100 |

*Primary Examiner*—D. Glenn Dayoan
*Assistant Examiner*—Long Bao Nguyen
*Attorney, Agent, or Firm*—Thomas Zack

[57] ABSTRACT

A combined storage container or box and cargo bed cover for use in and over the cargo bed of a pickup truck. Three embodiments are disclosed. In the first embodiment all of the foldable panel sections making up the bed cover are connected to each other and also to the container's top. Therein the cargo covers can be folded over each other and the container's top and be lifted up in this folded state to open the connected container top. For the second embodiment, the container's top has two foldable cargo bed cover panels not attached to the container's top thereby permitting their independent opening or closing. The third embodiment consists of a one piece openable cargo bed cover and a separate container top cover which cover is pivoted at one end. Like the second embodiment, both the cargo and container covers may be opened or closed independent of the other. A three sided support frame under the cargo bed cover is joined to the truck's cargo bed sides and bed end opposite its tailgate to form a lower supporting frame for the container top and cargo bed cover in each embodiment. Appropriate locks or fasteners may be used to hold the container's top and cargo bed covers in place to secure their contents to the truck.

5 Claims, 5 Drawing Sheets

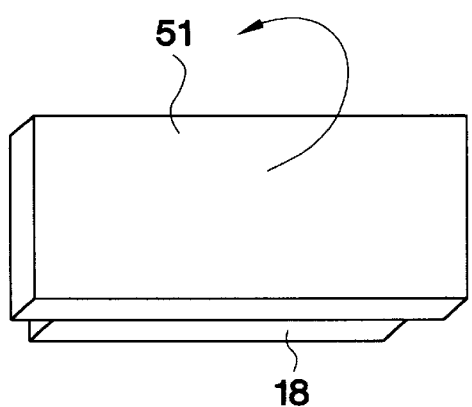
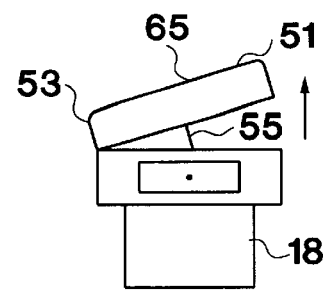
FIG. 6(a)　　　　FIG. 6(b)
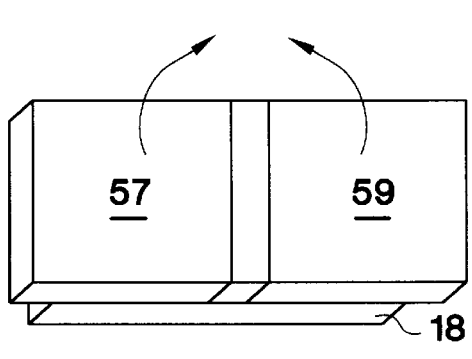
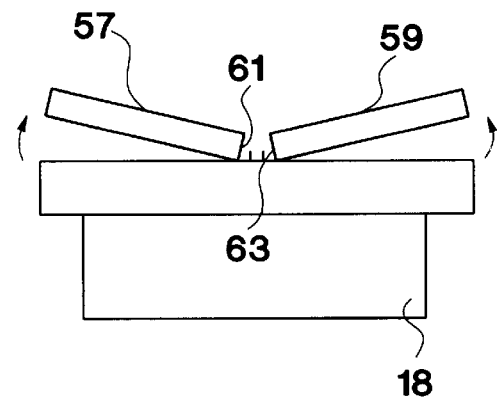
FIG. 6(c)　　　　FIG. 6(d)
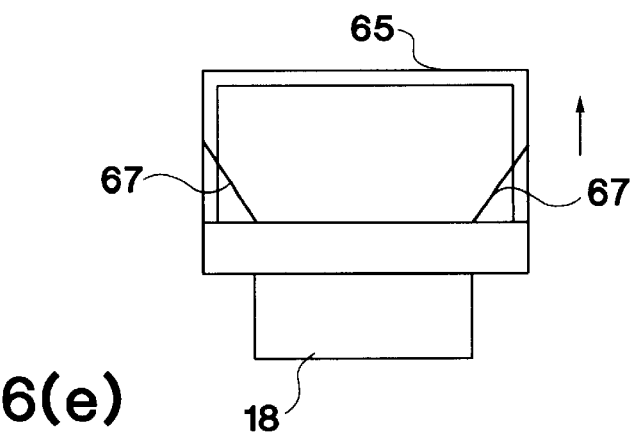
FIG. 6(e)

WORK BOX FRAME

BACKGROUND OF THE INVENTION

Pickup trucks have become one of the most, if not the most, popular vehicles on the roads of the United States. Among the main reasons for their popularity is their versality and price especially when they are used in conjunction with a business. To cover the contents of their hauled cargo various types of covers for the cargo bay have been developed. Some of these covers are solid members that cover the cargo bed and can be lifted on and off the cargo bed when used. Others include box-like structures which are attached to or mounted on the truck's cargo bed. Still other covers are flexible in their construction such that they can be folded, slide or telescoped back to permit entry to the cargo bed. When entry to truck bed is not desired, the same types of covers are then folded down or slide or telescoped out and and secured to cover the truck's bed. When the fold down type of cover type is used it is important that, when in their fold down position, the driver's view through the rear cab's window not be obstructed even in part. The present invention seeks to utilize an openable cover that can be moved to not obstruct a driver's view through the rear view cab window, when moved or folded down, which is combined with a truck bed work box mounted to the vehicle. In some embodiments, the work box can be opened to permit entry to its contents whether the cover is open or closed as described herein.

DESCRIPTION OF THE PRIOR ART

Truck bed work boxes and covers are well known. For example, in U.S. Pat. No. 4,418,954 to Buckley a foldable and lockable cover for a truck bed is described which has a pair of support members above the bed on the vehicle's bed walls. In the Steffens et al cargo bay cover patent (U.S. Pat. No. 4,946,217) an angle member mounted on the cargo bay sides forms a cargo seal with a flexible gasket to exclude moisture. A prior invention from the same inventor as the present invention (Repetti, U.S. Pat. No. 5,087,093) discloses a four section cover wherein the first section is fixed to the bed, the second and third sections hinged to each other and the fourth section releasable secured to the bed at its rear end. The last three cover sections may be folded onto the first section and tied off and held in place.

The Miller invention (U.S. Pat. No. 5,127,701) describes a shell for the truck's bed having a base member mounted on the bed and a top hinged member fitted over the base member. The storage box in the Brown patent (U.S. Pat. No. 5,201,561) can be secured to the truck's bed or have its cover part raised as in FIG. 3. And in U.S. Pat. No. 5,427,428 to Ericson et al. the foldable rigid material sheets have flexible hinges extending the width of the sheets to leak/weather proof the covered bed. In another embodiment, rollers may be mounted on one or both side rails to fold or unfold the cover. The present invention improves on these truck covers and storage boxes by providing for a storage box secured to the vehicle combined with a cargo bed cover. In some of the disclosed embodiments, the cargo bed cover is a foldable cover which can be folded flat over the box's top and secured in that position as more further set forth in this specification.

SUMMARY OF THE INVENTION

This invention relates to a combined storage box or container and cover for a pickup truck's cargo bed. Three different embodiments are disclosed. In the first and preferred embodiment, the storage container's cover and cover for the cargo bed are hingedly joined together. Therein, when the cargo bed's cover is folded up, it lays flat upon the top surface of the storage container and may be secured in place in that position or may be secured in place when fully extended to cover the cargo bed. In the other two embodiments both the storage container's top and the cover for the cargo bed can be secured and opened or closed independent of the other.

It is the primary object of the present invention to provide for an improved apparatus for a truck bed cover and storage box.

Another object is to provide for a cargo bed assembly wherein the storage box and bed cover may be opened or closed independently of the other.

These and other objects and advantages of the present invention will become apparent to readers from a consideration of the ensuing description and the accompanying drawings.

BRIEF DESCRIPTION OF THE DRAWINGS

FIGS. 6(a)–(e) are different views of the types of work boxes that can be used with the first two embodiments ((a)–(d) and the third single cover embodiment (e).

DESCRIPTION OF THE PREFERRED EMBODIMENT

Figure 1A:
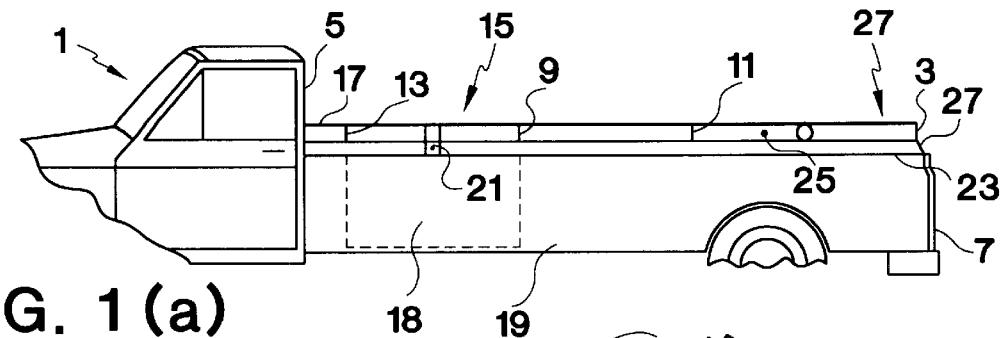
FIGS. 1(a)–(e) are side views of the invention's preferred embodiment showing the cover as mounted on the cargo bed of a pickup truck at different stages.
Figure 1B:
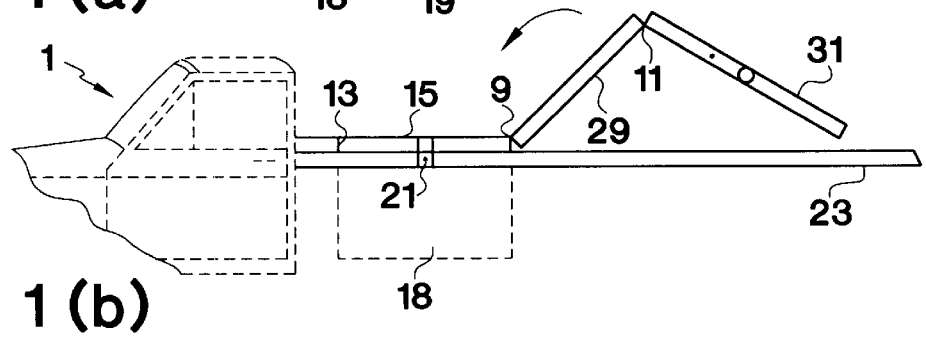
Figure 1C:
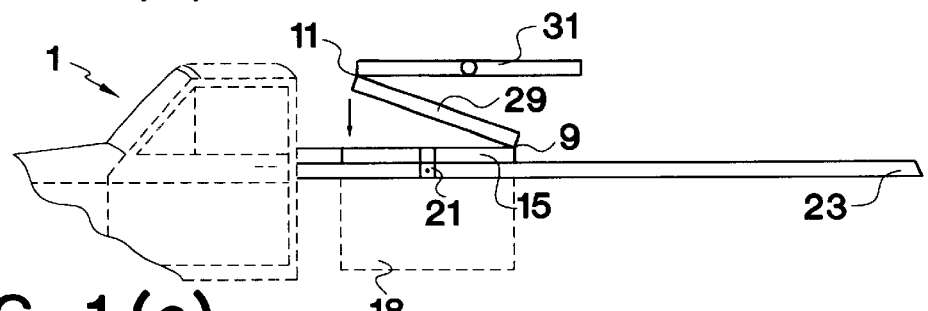
Figure 1D:
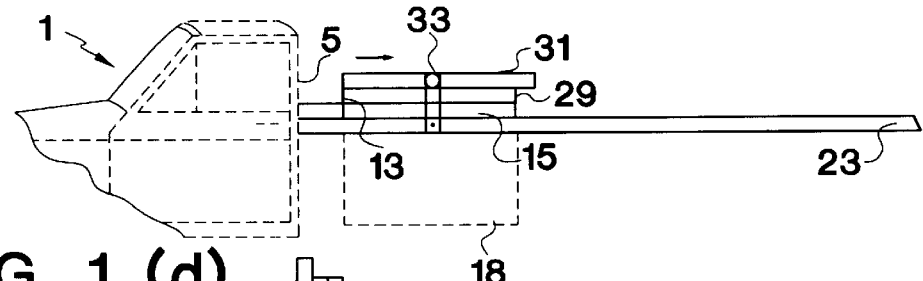
Figure 1E:
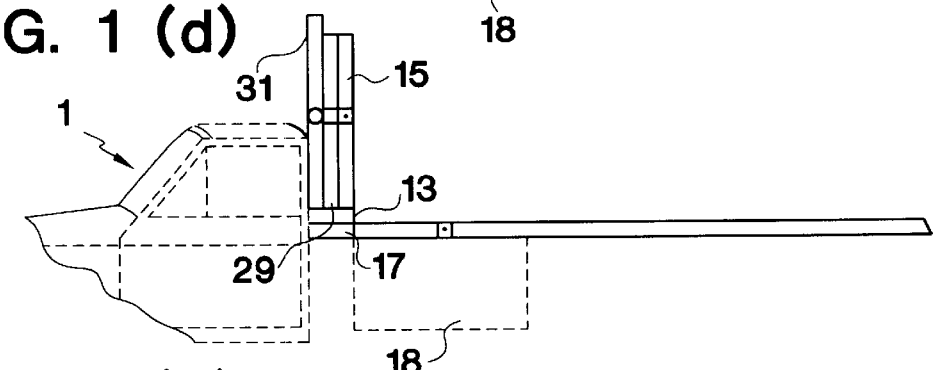
Figure 2A:
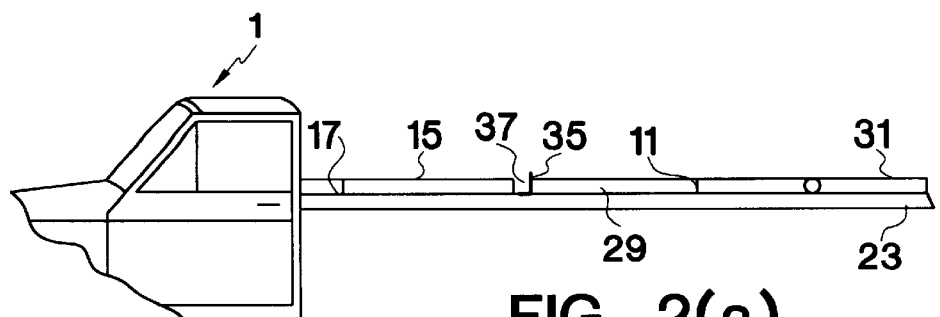
FIGS. 2(a)–(e) are side views of a second cover embodiment showing the cover at different stages.
Figure 2B:
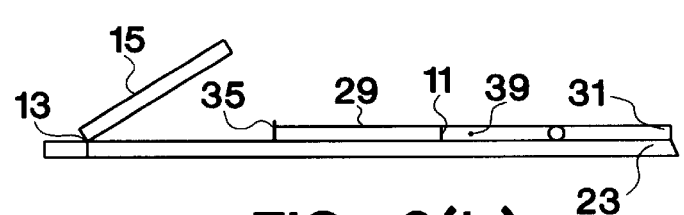
Figure 2C:
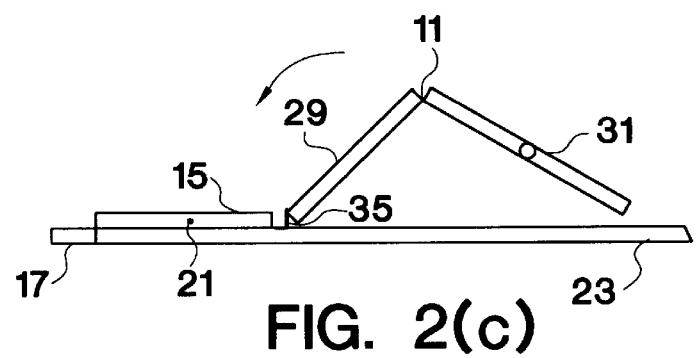
Figure 2D:
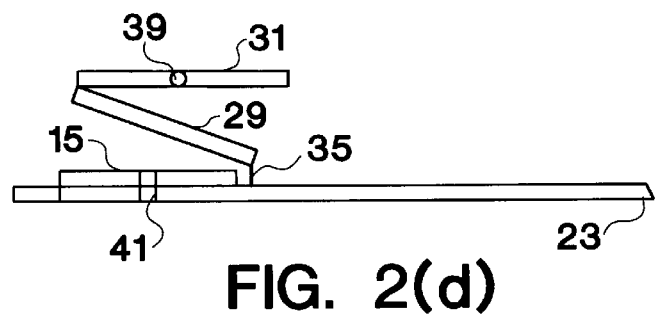
Figure 2E:
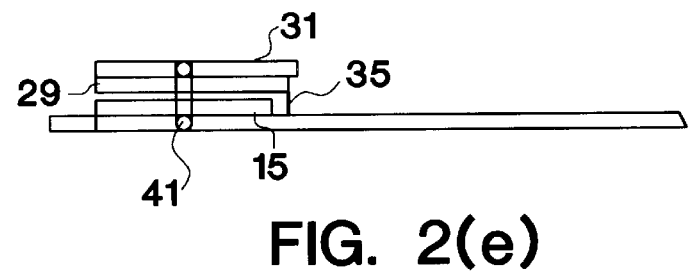

FIGS. 1(a)–(e) are side views of the invention's preferred embodiment showing the cover as mounted on the cargo bed of a typical pickup truck 1 at different stages of cover. For simplification purposes the truck operator's cab compartment as in FIG. 1(a) is the same for each figure and has been shown in dotted line format in FIGS. 1(b)–(e). In FIG. 1(a) the three joined main flat planar cover sections of cover 3 are fully extended to cover the cargo bed from just under the truck's rear view window 5 to its rear tailgate 7. The three main sections are joined together at their adjoining edges by hinges 9 and 11 to form a single cover unit. Hinge 9 is a top hinge and hinge 11 is an under or concealed hinge when viewed from above. An additional top hinge 13 located closer to the window 5 joins the work box container top or cover section 15 to the smaller stationary spacer cover section 17 located nearest the truck's operator's compartment. Cover section 15 functions as a cover section and also as the top cover for the closed lower work box 18, shown in dotted line format, which box extends down into the front part of the truck's underlying cargo bed 19. Two opposite side mounted locks 21 (one shown) lock the cover section 15 to a lower surrounding work box frame 23 which extends around the upper periphery of the cargo bed on third sides and is joined to the truck's two upright bed sides and the bed side near window 5. Additional conventional side locks, such as pressure side lock pairs 25 (one shown) and rear lock 27, may be used to further secure the extended cover to the truck's bed box frame 23.

In FIG. 1(*b*) the two rear cover sections 29 and 31 are partially raised from their FIG. 1(*a*) horizontal position on their hinged joining mountings 9 and 11 from the underlying supporting frame 23. The front cover section and work box top 15 is still secured in place by the pair of side locks 21 at this stage. As the cover sections are folded over more, (FIG. 1(*c*)) its rear most cover section 31 now has its underside over the underside of cover section 29 while the work box 18 top cover 15 still remains locked in place and horizontally disposed. In the FIG. 1(*d*) stage, the two rear most cover sections 29 and 31 are touching each other with surface of section 29 lying flat against the surface of front cover section 15. All three main sections (15,29, and 31) are flattened surfaced and have approximately the same surface area and outside dimensions to permit them to lie flat upon each other in a layered fashion as shown. One or more side fasteners 33 extend from top cover 15 to the top surface of section 31 to retain the two top folded cover sections in place as shown in FIG. 1(*d*) on top of cover 15. This fastener may be a conventional belt type fastener which extends completely across the top of upper section 31 and is locked in place at its two ends or it could simply extend upward from top cover 15 to engaging lock fasteners on the opposite sides of the upper cover section. Both types are conventional belt or strap type fasteners and either may be used to lock the section's in place. It is important to note that in this fold down position the driver's view from the rear view (see arrow) window 5 is left totally unobstructed by the folded down cover sections.

Should it be desired to gain entry to the underneath work box 18 when the cover sections are in the folded horizontal position as in the FIG. 1(*d*) stage, the two opposite side locks 21 are unlocked and the three stacked cover sections are moved upwardly pivoting on support hinge joint 13 to permit entry to the work box's contents as shown in FIG. 1(*e*). When in this opened stage, the three folded cover sections can rest against the back of the pickup's cab or driver's compartment which window 5 is a part.

FIGS. 2(*a*)–(*e*) are side views of a second cover embodiment showing this cover's embodiment at different stages. The essential different between this embodiment and that of the first embodiment (FIGS. 1(*a*)–(*e*)) is that the two rear most flat cover sections 29 and 31 are separate from and not joined by a hinge joint to the work box's forward top cover 15. Thus, the joining cover section hinge joint 9 used in the first embodiment is eliminated and replaced by a transverse stationary right angle bar 35 mounted on lower work box frame 23 having it own connected upper hinge to pivotally connected the bar to the adjacent rear cover section 29. There also is a transverse space separation 37 above the bar between the cover section's 29 and the adjacent edge for top cover 15. The lower transverse area over the cargo bed is thus covered by the horizontal leg of the right angle bar 35 which extends widthwise across the bed. This insures that the cargo bed underneath is completely covered from above in the FIG. 2(*a*) stage. In this second embodiment the work box top 15 functions only as a top for the work box and does not provide the dual function cover and work box top spelled out in the first embodiment. As shown in FIG. 2(*a*), the two extended cover sections 29 and 31 are joined together by the concealed hinge 11 as in the first embodiment and they extend over much of the opened cargo bed and are mounted on their sides to the side work frame 23. As shown in the next figure, FIG. 2(*b*), work box's top cover 15 may be opened via its forward hinged joint 13 on smaller cover section 17 independently of the still remaining extended, closed and horizontal two cargo bed cover sections 29 and 31. An optional side conventional pressure lock 39 may be used to secure the two cover sections to the lower work box frame 23. Should it be desired to keep the work box closed, the two cover sections 29 and 31 may be folded at their interfacing hinge connection 11 while the front work box cover 15 remains secured in place as depicted in FIG. 2(*c*). By further folding the two sections 29 and 31 on their respective two hinge joints 11 and the upper hinge on angle member 35 (see FIG. 2(*d*)), section 31 has its flat underside facing the underside of section 29. When completely folded down as in FIG. 2(*d*), the two folded cover cargo bed sections lie over or horizontally on the top of the work box cover 15 and may be fastened or locked in this position by a conventional belt or strap type fasteners with a lock 41 similar to fastener 33 in FIG. 1(*d*). This conventional strap or belt type fastener, as in the first embodiment, may extend completely across the top of upper section 31 and be locked in place at its two ends or may simply extend upward from the frame. When so locked or fastened (FIG. 2(*d*)) the work box cover 15 may not be opened just as in the first embodiment. This folded down last stage would typically be used when a large object is placed in the truck's opened cargo bed and it is desired to travel between two locations with the work box closed.

Figure 3A:
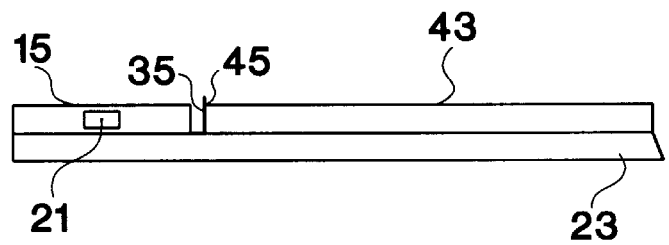
FIGS. 3(a)–(c) shows a side views of a third cover embodiment in three different stages.
Figure 3B:
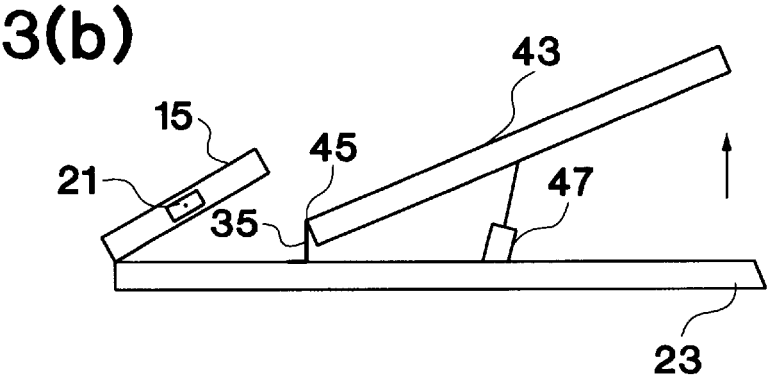
Figure 3C:
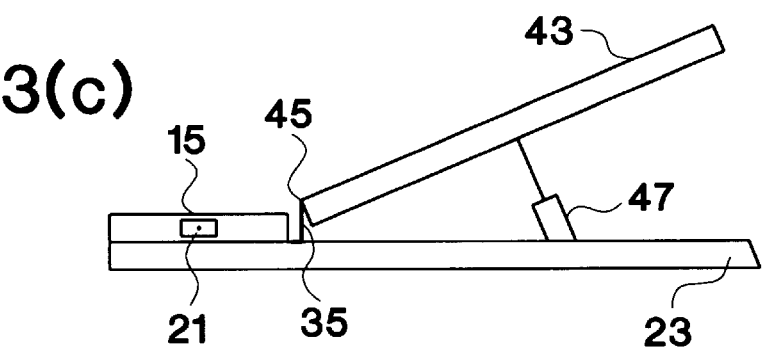

FIGS. 3(*a*)–(*c*) shows a side views of a third different cover embodiment in three different stages. In this embodiment the cargo bed cover section 43 is a one piece flat planar construction mounted on the lower work box frame member 23. At its end nearest the work box cover 15, the cover section 43 has a hinge joint 45, like the upper hinge on right angle joint 35, to permit the pivotal lifting of the cover 43 from the truck's cargo bed. It also has the transverse right angle bar 35 which is joined at its top to the hinge 45, as in the second embodiment, mounted on lower work box frame 23. To aid in the lifting process and to keep the lifted cover opened, one or more side hydraulic lifters 47, such as those typically used in vehicle's hood openers, are attached to frame 23 may be placed under the cover 43 and joined between the cover about midway of its length between it and the lower side work frame 23 as shown in FIG. 3(*b*). In the third stage, FIG. 3(*c*), the work box cover 15 is horizontal and closed and secured by side locks 21 while the cargo bed cover 43 remains lifted and opened. Thus, in the third embodiment either the cover 43 for the cargo bed or the cover 15 for the closed work box 17 may be opened and closed totally independently of the other.

Figure 4:
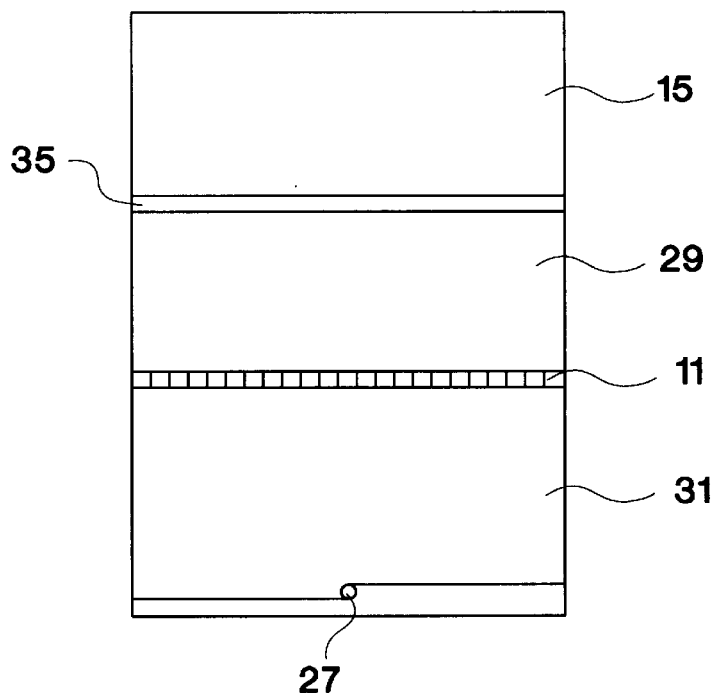
FIG. 4 shows an underside view of the cover and work box used in first two embodiments.

FIG. 4 shows an underside view of the cover and work box similar to those used in first two embodiments. For illustrative purpose the second embodiment is depicted. The under side hinge 11 joining the two rear cover sections 29 and 31 of the cargo bed extends completely across the sections' width and is concealed from view from above when on the cargo bed. When so mounted on a pickup truck's cargo bed, at section's 31 end nearest the truck's tail gate a rear conventional lock 27, such as in the first embodiment may be used to lock the section to the tailgate. If desired, two side locks 25 such as those shown in the first embodiment may be used either by themselves or in conjunction with the rear lock 27 to lock the cover sections to the underlying work frame 23.

Figure 5:
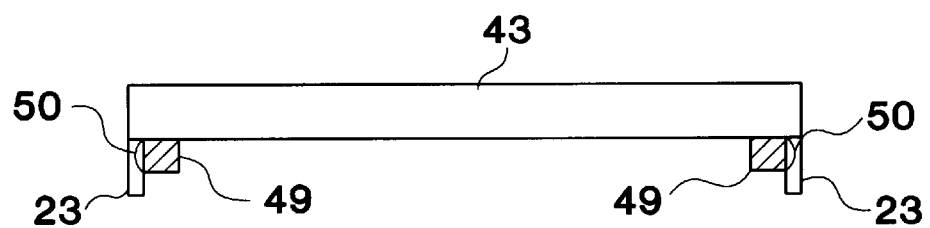
FIG. 5 shows a cross-sectional front view of the in-pace cover and its side gaskets and supports.

Any of the three embodiments may utilize side gaskets 49 (see FIG. 5) mounted in longitudinal ridges running along the three interior opposite sides of work frame 23 to prevent moisture from entering into the lower cargo bed when covered. FIG. 5 shows a cross-sectional front view of any of the covers and its side gaskets 49 mounted to the side ridges 50 in the sides of the frame supports 23. In this example, the one piece cargo bed cover 43 is illustrated, it being understood that any of the other cover sections (15,29, or 31) may utilize similar peripheral gaskets along their frame engaging sides.

FIGS. 6(a)–(e) are different views of conventional types of work boxes that can be used with the last two embodiments as shown in FIGS. 2 and 3. The work boxes of FIGS. 6(a) and (b) are the same box viewed from two different directions. In the top view, FIG. 6(a), the unitary cover work box cover 51 has a rear hinge 53 similar to hinge 13 in the first embodiment. The side view of the same work box with its cover 51 opened shows an internal cover support member 55 used to help in the opening or maintaining opening of the cover 51. FIGS. 6(c) and (d) illustrate different views of a different work box with dual work box covers. In the top view, FIG. 6(c), the two hinged work box covers 57 and 59 are shown closed. They may be either locked, unlocked or fastened to the adjacent work frame sides 23 as desired. The side view of the same dual work box top, FIG. 6(d), shows top covers being opened at their separate adjacent hinged connections 61 and 63. The last single work box cover, FIG. 6(e), is a side view of a typical opened cover 65 work box with two interior side lifters 67, similar to lifters 47, usable with the third one piece cover embodiment of FIG. 3.

Figure 7:
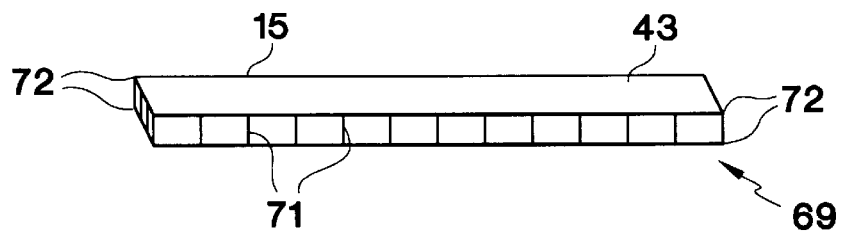
FIGS. 7(a)–(b) are side and top views, respectively, of a support frame usable with the cover.
Figure 7:
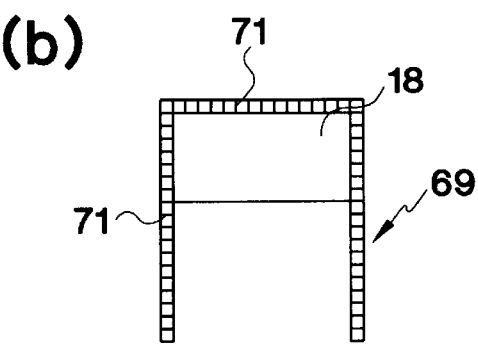

FIGS. 7(a)–(b) are a side and a modified top view, respectively, of a different support frame usable with the different covers. It can be used with any of the embodiments but for illustrative purposes has been shown used with the covers of the third embodiment disclosed in FIG.3. Like the work box frame 23 previously described, the three sided frame 69 of FIG. 7 has three joined sides which sit on the three top sides of the truck's existing lower cargo bed. Rather than a solid three sided frame as is frame 23, this frame has a series of vertical equally spaced opened side supports 71 extending along its length and the frame as shown in the side view of FIG. 7(a). These vertical supports 71 engage solid horizontal rail members 72 on both their tops and bottoms. The upper horizontal members 72 in turn engage and support the upper solid planar cargo bed cover 43 along its three sides. The vertical supports 71 also transverse the width of cargo bed near forward edge of the work box container 18 where it sits against the truck operator's compartment as depicted in the FIG. 7(b) top view where its top solid rail support member 72 is omitted. If the user desires to secure the frame 69 to the truck's cargo bed with clamps, the spacing between supports 71 may be used by inserting the clamp through these spaced supports and clamping it against the lower attached member 72 to the trucks bed's three sides, excluding the rear tail gate, before the cover is mounted over the frame.

Each of the different cargo covers, whether hinged panel sections or a single panel, and the container top 15 should be made of a rigid material that is strong and resistant to the weather elements, especially moisture. Examples of materials that may be used include galvanized metal sheets, injection molded plastic panels like high impact ABS (Acrylonitrile-butadiene-styrene) plastic material, fiberglass, wood or any other suitable material which is functionally acceptable and aesthetically pleasing. Handles, locks or other features, such a roughed surfaces, as well as any colors may be molded into the finished product or added after the manufacturing process is completed.

Each of the disclosed three sided frame members 23 or 69 are secured to the truck's cargo bed along three sides (excluding the tail gate) by conventional fasteners to form a secure base support for the attached covers. Conventional fasteners such as removal clamps, bolts, screws, etc. could be used for this purpose. Like the cargo bed covers, the frame members should be made of a weather resistant material such as fiberglass, treated wood, plastic, galvanized metal, aluminum, or the like.

Although the present invention's preferred embodiment and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A combined storage container and cargo bed cover assembly for use with a truck having an opened cargo bed comprising in combination:

a truck having an operator's cab with a rear window, said truck having a top opened cargo bed with three sides, the front portion of the cargo bed being located adjacent said operator's cab rear window;

a work box frame mounted in said truck's opened cargo bed and extending around the three sides of said opened cargo bed and fixedly mountable thereon;

a storage container box mounted to said work box frame, said container box having sides extending into the truck's opened bed and a pivotally mounted openable, and closable top cover, said container box being capable of fitting within the front portion of the truck's opened cargo bed adjacent said cab rear window;

an openable and closable cargo bed cover mounted on said work box frame adjacent said storage container box, said bed cover having a first front flat planar cover section connected by a mounted first pivotal connection to a second rear flat planar cover section, each of said first and second bed cover sections when fully closed being substantially flat and aligned substantially horizontally with said closed top covers, said first and second bed cover sections when fully opened being foldable at said first pivotal connection to be positionable flat one section over the other section;

said first cover bed section also having a second pivotal connection on the first section's side opposite to where the first pivotal connection is mounted, said second pivotal connection being adjacent to said top cover of the container box, said first bed cover section and said second bed cover section when folded at their first pivotal connection being further foldable at said second pivotal connection to be positioned flat directly over the closed top cover of the container box whereby when folded over each other the folded first and second cover sections and the closed lower covered container box top cover are lower than the rear window of the operator's cab; and means for mounting said storage container box and said cargo bed cover to the work box frame and to at least some of the three sides of said truck's opened cargo bed.

2. The combination as claimed in claim 1, wherein said means for mounting said storage container box and said cargo bed cover to the work box frame comprises a series of spaced parallel vertical support members extending around the frame that can be used to vertically support the overhead cargo bed cover.

3. The combination as claimed in claim 1, wherein said second pivotal connection is mounted on both said first cover section side and said top cover of the container box whereby said first cover section and said second cover section when folded on the first pivotal connection may be further folded on said second pivotal connection to be positioned flat and over the closed top cover of the storage container.

4. The combination as claimed in claim 1, including lock means for locking the opened and folded cover sections to the closed top cover and the work frame.

5. The combination as claimed in claim 1, also including a bed cover supporting element fixed to the work box frame located between said first bed cover section and the top cover of the storage container box, said supporting element being mounted to said first bed cover section by said second pivotal connection, said second pivotal connection being separated from the top of the storage container box.

* * * * *